(12) United States Patent
Dershem et al.

(10) Patent No.: US 8,378,017 B2
(45) Date of Patent: Feb. 19, 2013

(54) THERMOSETTING ADHESIVE COMPOSITIONS

(75) Inventors: Stephen M. Dershem, San Diego, CA (US); Gina Hoang, San Diego, CA (US); Melin Lu, San Diego, CA (US)

(73) Assignee: Designer Molecules, Inc., San Diego, CA (US)

( * ) Notice: Subject to any disclaimer, the term of this patent is extended or adjusted under 35 U.S.C. 154(b) by 916 days.

(21) Appl. No.: 11/639,625

(22) Filed: Dec. 14, 2006

(65) Prior Publication Data

US 2007/0155869 A1    Jul. 5, 2007

Related U.S. Application Data

(60) Provisional application No. 60/754,400, filed on Dec. 29, 2005.

(51) Int. Cl.
C08L 37/00 (2006.01)

(52) U.S. Cl. ..... 524/530; 252/512; 252/514; 252/518.1; 427/372.2; 427/385.5; 427/386; 523/457; 523/466; 523/467; 524/425; 524/427; 524/439; 524/441; 524/493; 524/495; 524/529; 524/531; 524/532; 524/533

(58) Field of Classification Search ............... 524/425, 524/427, 430, 493, 495, 523, 530, 439, 441, 524/529, 531, 532, 533; 252/512, 514, 518.1; 427/372.2, 385.5, 386; 523/457, 466, 467
See application file for complete search history.

(56) References Cited

U.S. PATENT DOCUMENTS

| | | | |
|---|---|---|---|
| 4,111,879 A | 9/1978 | Mori et al. | |
| 4,224,216 A | 9/1980 | Locatelli et al. | |
| 4,395,462 A | 7/1983 | Polmanteer | |
| 4,894,281 A | 1/1990 | Yagi et al. | |
| 4,968,738 A | 11/1990 | Dershem | |
| 5,045,127 A | 9/1991 | Dershem et al. | |
| 5,064,480 A | 11/1991 | Dershem et al. | |
| 5,087,705 A | 2/1992 | Okada et al. | |
| 5,155,177 A | 10/1992 | Frihart | |
| 5,232,962 A | 8/1993 | Dershem et al. | |
| 5,306,333 A | 4/1994 | Dershem et al. | |
| 5,358,992 A | 10/1994 | Dershem et al. | |
| 5,403,389 A | 4/1995 | Dershem | |
| 5,430,112 A | 7/1995 | Sakata et al. | |
| 5,447,988 A | 9/1995 | Dershem et al. | |
| 5,489,641 A | 2/1996 | Dershem | |
| 5,567,761 A | 10/1996 | Song | |
| 5,602,205 A | 2/1997 | Singh et al. | |
| 5,646,241 A | 7/1997 | Dershem et al. | |
| 5,714,086 A | 2/1998 | Osuna et al. | |
| 5,717,034 A | 2/1998 | Dershem et al. | |
| 5,718,941 A | 2/1998 | Dershem et al. | |
| 5,753,748 A | 5/1998 | Dershem et al. | |
| 5,861,111 A | 1/1999 | Dershem et al. | |
| 5,932,637 A * | 8/1999 | Ito et al. | 523/451 |
| 5,969,036 A | 10/1999 | Dershem | |
| 5,973,166 A | 10/1999 | Mizori et al. | |
| 6,034,150 A | 3/2000 | Hoyle et al. | |
| 6,034,194 A | 3/2000 | Dershem | |
| 6,034,195 A | 3/2000 | Dershem | |
| 6,048,953 A | 4/2000 | Kawashima et al. | |
| 6,063,828 A | 5/2000 | Ma et al. | |
| 6,121,358 A | 9/2000 | Dershem et al. | |
| 6,187,886 B1 | 2/2001 | Husson, Jr. et al. | |
| 6,211,320 B1 | 4/2001 | Dershem et al. | |
| 6,265,530 B1 * | 7/2001 | Herr et al. | 528/322 |
| 6,281,314 B1 | 8/2001 | Tong | |
| 6,300,456 B1 | 10/2001 | Musa | |
| 6,316,566 B1 | 11/2001 | Ma et al. | |
| 6,355,750 B1 * | 3/2002 | Herr | 526/262 |
| 6,369,124 B1 | 4/2002 | Hoyle et al. | |
| 6,423,780 B1 | 7/2002 | Dershem et al. | |
| 6,429,281 B1 | 8/2002 | Dershem et al. | |
| 6,521,731 B2 | 2/2003 | Dershem et al. | |
| 6,610,808 B2 | 8/2003 | De et al. | |
| 6,620,946 B2 | 9/2003 | Dershem et al. | |
| 6,743,852 B2 | 6/2004 | Dershem et al. | |
| 6,750,301 B1 | 6/2004 | Bonneau et al. | |
| 6,790,597 B2 | 9/2004 | Dershem | |

(Continued)

FOREIGN PATENT DOCUMENTS

EP    0393713 B1    6/1994
EP    1156036    11/2001

(Continued)

OTHER PUBLICATIONS

V. Anand & V. Choudhary, "Copolymerization and thermal behavior of methyl methacrylate with N-(phenyl/p-tolyl) itaconimides," Journal of Applied Polymer Science (2003) vol. 89, pp. 1195-1202.

(Continued)

*Primary Examiner* — David W Wu
*Assistant Examiner* — Marie Reddick
(74) *Attorney, Agent, or Firm* — The Law Office of Jane K. Babin, Professional Corporation; Jane K. Babin

(57) ABSTRACT

The invention is based on the discovery that adhesive compositions containing certain low-viscosity, mono-ethylenically unsaturated monomers have surprisingly good cure parameters, resulting in very little weight loss upon cure. Many of these monofunctional monomers used alone or in combination with other monofunctional monomers described herein have high glass transition temperatures when cured. Moreover, since these monomers are monofunctional the crosslink density of the adhesive composition does not increase (relative to multi-functional monomers), which in turns results in lower stress, lower modulus adhesive compositions. As such, these monomers are useful in a variety of thermoset adhesive compositions, such as for example, die attach adhesive compositions.

11 Claims, No Drawings

U.S. PATENT DOCUMENTS

| | | |
|---|---|---|
| 6,825,245 B2 | 11/2004 | Dershem |
| 6,831,132 B2 | 12/2004 | Liu et al. |
| 6,852,814 B2 | 2/2005 | Dershem et al. |
| 6,855,745 B2 | 2/2005 | Hoyle et al. |
| 6,916,856 B2 | 7/2005 | Dershem |
| 6,946,523 B2 | 9/2005 | Dershem et al. |
| 6,960,636 B2 | 11/2005 | Dershem et al. |
| 6,963,001 B2 | 11/2005 | Dershem et al. |
| 7,102,015 B2 | 9/2006 | Dershem et al. |
| 7,157,587 B2 | 1/2007 | Mizori et al. |
| 7,176,044 B2 | 2/2007 | Forray et al. |
| 7,199,249 B2 | 4/2007 | Liu et al. |
| 7,208,566 B2 | 4/2007 | Mizori et al. |
| 7,285,613 B2 | 10/2007 | Dershem et al. |
| 7,309,724 B2 | 12/2007 | Dershem et al. |
| 7,517,925 B2 | 4/2009 | Dershem et al. |
| 7,678,879 B2 | 3/2010 | Dershem |
| 2002/0007042 A1* | 1/2002 | Herr et al. ............... 528/322 |
| 2002/0062923 A1 | 5/2002 | Forray |
| 2002/0099168 A1 | 7/2002 | Dershem et al. |
| 2002/0188137 A1 | 12/2002 | Dershem et al. |
| 2002/0193541 A1 | 12/2002 | Dershem et al. |
| 2002/0198356 A1 | 12/2002 | Dershem et al. |
| 2003/0008992 A1 | 1/2003 | Dershem et al. |
| 2003/0055121 A1 | 3/2003 | Dershem et al. |
| 2003/0060531 A1 | 3/2003 | Dershem et al. |
| 2003/0083436 A1 | 5/2003 | Deitch |
| 2003/0087999 A1 | 5/2003 | Dershem et al. |
| 2003/0096123 A1 | 5/2003 | Yeager |
| 2003/0109666 A1 | 6/2003 | Dershem et al. |
| 2003/0125551 A1 | 7/2003 | Dershem et al. |
| 2003/0129438 A1 | 7/2003 | Becker et al. |
| 2003/0199638 A1 | 10/2003 | Liu et al. |
| 2003/0208016 A1 | 11/2003 | Dershem et al. |
| 2004/0006166 A1 | 1/2004 | Liu et al. |
| 2004/0019224 A1 | 1/2004 | Dershem et al. |
| 2004/0023926 A1 | 2/2004 | Guennouni et al. |
| 2004/0077798 A1 | 4/2004 | Dershem et al. |
| 2004/0082724 A1 | 4/2004 | Dershem et al. |
| 2004/0102566 A1 | 5/2004 | Forray et al. |
| 2004/0123948 A1 | 7/2004 | Dershem et al. |
| 2004/0147640 A1* | 7/2004 | Hwang et al. ............ 523/400 |
| 2004/0225026 A1 | 11/2004 | Mizori et al. |
| 2004/0225045 A1 | 11/2004 | Forray |
| 2004/0225059 A1 | 11/2004 | Mizori et al. |
| 2005/0027082 A1 | 2/2005 | Narayan-Sarathy et al. |
| 2005/0107542 A1 | 5/2005 | Liu et al. |
| 2005/0136620 A1 | 6/2005 | Dershem et al. |
| 2005/0137277 A1 | 6/2005 | Dershem et al. |
| 2005/0267254 A1 | 12/2005 | Mizori et al. |
| 2005/0272888 A1 | 12/2005 | Dershem et al. |
| 2006/0009570 A1 | 1/2006 | Zychowski |
| 2006/0009578 A1 | 1/2006 | Dershem |
| 2006/0063014 A1 | 3/2006 | Forray |
| 2006/0069232 A1 | 3/2006 | Dershem |
| 2006/0089447 A1 | 4/2006 | Robertson et al. |
| 2006/0116476 A1 | 6/2006 | Cheng |
| 2006/0142517 A1 | 6/2006 | Dershem |
| 2007/0155869 A1 | 7/2007 | Dershem et al. |
| 2007/0205399 A1 | 9/2007 | Mizori |
| 2007/0299154 A1 | 12/2007 | Dershem et al. |
| 2008/0017308 A1 | 1/2008 | Dershem et al. |
| 2008/0075961 A1 | 3/2008 | Mizori |
| 2008/0075963 A1 | 3/2008 | Dershem |
| 2008/0075965 A1 | 3/2008 | Dershem |
| 2008/0103240 A1 | 5/2008 | Dershem |
| 2008/0142158 A1 | 6/2008 | Dershem |
| 2008/0146738 A1 | 6/2008 | Dershem |
| 2008/0160315 A1 | 7/2008 | Forray et al. |
| 2008/0191173 A1 | 8/2008 | Dershem et al. |
| 2008/0210375 A1 | 9/2008 | Dershem et al. |
| 2008/0251935 A1 | 10/2008 | Dershem |
| 2008/0257493 A1 | 10/2008 | Dershem |
| 2008/0262191 A1 | 10/2008 | Mizori |
| 2009/0061244 A1 | 3/2009 | Dershem |
| 2009/0215940 A1 | 8/2009 | Dershem |
| 2009/0288768 A1 | 11/2009 | Dershem |
| 2010/0041803 A1 | 2/2010 | Dershem |
| 2010/0041823 A1 | 2/2010 | Dershem |
| 2010/0041832 A1 | 2/2010 | Dershem |
| 2010/0041845 A1 | 2/2010 | Dershem et al. |
| 2010/0056671 A1 | 3/2010 | Dershem |
| 2010/0063184 A1 | 3/2010 | Dershem |

FOREIGN PATENT DOCUMENTS

| | | |
|---|---|---|
| EP | 1834969 | 9/2007 |
| WO | WO-2005121190 | 12/2005 |
| WO | WO-2007100329 | 9/2007 |
| WO | WO-2008077141 | 6/2008 |
| WO | WO-2008124797 | 10/2008 |
| WO | WO-2008130894 | 10/2008 |
| WO | WO-2010019832 | 2/2010 |

OTHER PUBLICATIONS

M. Grenier-Loustalot & N. Aycaguer, "Monofunctional maleimide or acetylene terminated model compounds-I. Molten state homopolymerization reactivity and kinetics," European Polymer Journal (1998) vol. 34(11), pp. 1705-1714.

H. Yamazaki, A. Matsumoto, & T. Otsu, "Effect of N-substituents on polymerization reactivity of N-alkylitaconimides in radical polymerization" European Polymer Journal (1997) vol. 33 (2), pp. 157-162.

Adamson, "Review of CSP and Flip Chip Underfill Processes and When to Use the Right Dispensing Tools for Efficient Manufacturing", Paper Presented at GlobalTRONICS Technology Conference, Singapore 2002, 1-6.

Andersson et al., "Initiator-Free Photopolymerization of an Aliphatic Vinyl Ether-Maleimide Monomer", J Coatings Tech 69: 1997, 91-95.

Kohli et al., "Co-Polymerization of Maleimides and Vinyl Ethers: A Structural Study", Macromolecules 31: 1998, 5681-5689.

Mimura et al., "Characteristics of epoxy resin cured with in situ polymerized curing agent", Polymer 43: 2002, 7559-7566.

\* cited by examiner

THERMOSETTING ADHESIVE COMPOSITIONS

RELATED APPLICATION DATA

This application claims the benefit of priority of U.S. Provisional Application Ser. No. 60/754,400 filed Dec. 29, 2005, the entire disclosure of which is incorporated herein by reference.

FIELD OF THE INVENTION

The present invention relates to thermosetting adhesive compositions, methods of preparation and uses therefor. In particular, the present invention relates to thermosetting compounds and compositions containing low molecular weight, mono-functional monomers.

BACKGROUND OF THE INVENTION

Adhesives used in the electronic packaging industry typically contain a thermosetting resin combined with a filler and some type of curing initiator. These resins are primarily used in the electronics industry for the preparation of non-hermetic electronic packages. Adhesives useful for electronic packaging applications typically exhibit properties such as good mechanical strength, curing properties that do not affect the function of the component or the carrier, and rheological properties compatible with application to microelectronic and semiconductor components. Examples of such packages are ball grid array (BGA) assemblies, super ball grid arrays, IC memory cards, chip carriers, hybrid circuits, chip-on-board, multi-chip modules, pin grid arrays, and the like.

One area of continuing research in the electronic packaging industry is the development of low stress, high $T_g$ adhesives. It is well known that glass transition ($T_g$) temperatures can be readily increased through the use of polyfunctional monomers. One, often very undesirable, consequence of the use of such polyfunctional monomers is that both cure stress and modulus are also significantly increased. Thus, the use of high levels of polyfunctional monomers to boost the $T_g$ of thermoset adhesives can often be counter productive in terms of the final cured properties of the adhesive. It would be very useful to have high $T_g$ monofunctional monomers. These compounds could be used to lower crosslink density while preserving or, in many cases, increasing the glass transition temperature of the adhesive formulation. Therefore, it is desirable to have a thermoset with a high $T_g$ and a low crosslink density. A higher $T_g$ will retain the lower coefficient of thermal expansion (CTE) of $\alpha_1$ (i.e. the low CTE that exists prior to the $T_g$). A thermoset adhesive with a high $T_g$ and a low cross-link density is considered superior because this combination results in lower interfacial stress.

SUMMARY OF THE INVENTION

The invention is based on the discovery that adhesive compositions containing certain low-viscosity, mono-ethylenically unsaturated monomers have surprisingly good cure parameters, resulting in very little weight loss upon cure. Many of these monofunctional monomers used alone or in combination with other mono-functional monomers described herein have high glass transition temperatures when cured. Moreover, since these monomers are monofunctional the cross-link density of the adhesive composition does not increase (relative to multi-functional monomers), which in turns results in lower stress, lower modulus adhesive compositions. As such, these monomers are useful in a variety of thermoset adhesive compositions, such as for example, die attach adhesive compositions.

Monofunctional, ethylenically unsaturated monomers are useful in adhesive formulations based on free radical cure because they can participate in chain extension polymerization without increasing the crosslink density of a thermoset composition. A current limitation in the art is the lack of suitable monofunctional monomers that have both high glass transition and low weight loss. Some higher molecular weight monofunctional monomers are available, such as octadecyl methacrylate, which has lower weight loss by virtue of its relatively high molecular weight. Unfortunately, such monomers also depress the glass transition temperature.

Isobornyl(meth)acrylate, styrene, and t-butylstyrene are commercially available, monofunctional monomers that give higher glass transition temperatures, but they also have very high weight loss. This makes them unattractive for use in many thermoset adhesive applications. The significant weight loss during cure that occurs when these monomers are used can result in voiding and, furthermore, their use is both an environmental and human health concern.

The ideal monofunctional monomers would have low weight loss during cure, low viscosity at room temperature, and a high $T_g$ when cured. Described herein are a variety of ethylenically unsaturated monomers that independently, and/or in combination, possess all of these properties and overcome the limitations of the mono-functional monomers that are currently available commercially.

In one embodiment, there are provided adhesive compositions including at least one thermosetting resin and at least one monomer having the structure

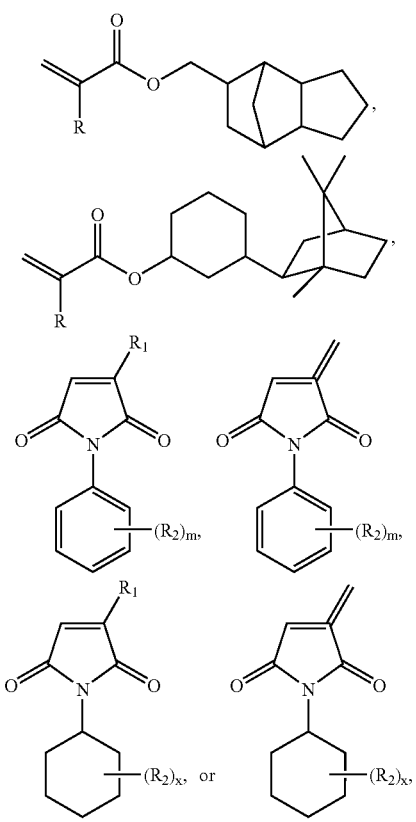

wherein:

R and $R_1$ are each H or methyl, each $R_2$ is independently alkyl, alkoxy, aryloxy, halide, or —O(CO)—$R_3$, wherein $R_3$ is $C_1$-$C_{10}$ alkyl, m is 0 to 5, and x is 0 to 11.

In other embodiments of the invention, there are provided methods for increasing the $T_g$ value of an adhesive composition without significantly increasing the modulus of the composition, methods for producing an adhesive composition having a $T_g$ value greater than about 50° C., and methods for attaching a semiconductor die to a substrate.

DETAILED DESCRIPTION OF THE INVENTION

It is to be understood that both the foregoing general description and the following detailed description are exemplary and explanatory only and are not restrictive of the invention claimed. As used herein, the use of the singular includes the plural unless specifically stated otherwise. As used herein, "or" means "and/or" unless stated otherwise. Furthermore, use of the term "including" as well as other forms, such as "includes," and "included," is not limiting. The section headings used herein are for organizational purposes only and are not to be construed as limiting the subject matter described.

Unless specific definitions are provided, the nomenclatures utilized in connection with, and the laboratory procedures and techniques of analytical chemistry, synthetic organic and inorganic chemistry described herein are those known in the art. Standard chemical symbols are used interchangeably with the full names represented by such symbols. Thus, for example, the terms "hydrogen" and "H" are understood to have identical meaning. Standard techniques may be used for chemical syntheses, chemical analyses, and formulation.

As used herein, "alkyl" refers to straight or branched chain hydrocarbyl groups having from 1 up to about 100 carbon atoms. Whenever it appears herein, a numerical range, such as "1 to 100" or "$C_1$-$C_{100}$", refers to each integer in the given range; e.g., "$C_1$-$C_{100}$ alkyl" means that an alkyl group may comprise only 1 carbon atom, 2 carbon atoms, 3 carbon atoms, etc., up to and including 100 carbon atoms, although the term "alkyl" also includes instances where no numerical range of carbon atoms is designated). "Substituted alkyl" refers to alkyl moieties bearing substituents including alkyl, alkenyl, alkynyl, hydroxy, oxo, alkoxy, mercapto, cycloalkyl, substituted cycloalkyl, heterocyclic, substituted heterocyclic, aryl, substituted aryl, heteroaryl, substituted heteroaryl, aryloxy, substituted aryloxy, halogen, haloalkyl, cyano, nitro, nitrone, amino, amido, —C(O)H, —C(O)—, —C(O)—, —S—, —S(O)$_2$—, —OC(O)—O—, —NR—C(O)—R—C(O)—NR—, —OC(O)—NR—, wherein R is H or lower alkyl, acyl, oxyacyl, carboxyl, carbamate, sulfonyl, sulfonamide, sulfuryl, and the like.

As used herein, "alkoxy" refers to a moiety having the structure O-alkyl, with alkyl defined as above.

The present invention provides monofunctional, low molecular weight compounds that, when incorporated into an adhesive composition, increase $T_g$ values of the adhesive compositions without significantly increasing the modulus of the compositions. As used herein, "monofunctional" refers to a compound that has one unit of ethylenic unsaturation. As used herein, "increase" or "significant increase" with respect to $T_g$ values means that the $T_g$ value of a given adhesive composition is at least 50° C. In other aspects, "increase" or "significant increase" means that the $T_g$ value of a given adhesive composition is at least 100° C. In still other aspects, "increase" or "significant increase" means that the $T_g$ value of a given adhesive composition is at least 150° C.

Mono-functional compounds contemplated for use in the practice of the invention include compounds having the structure

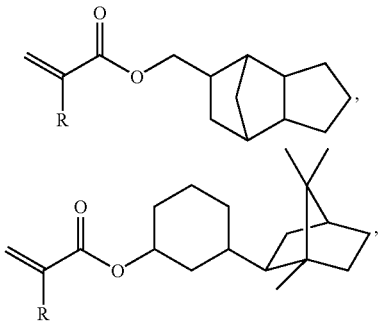

wherein R is —H or methyl,

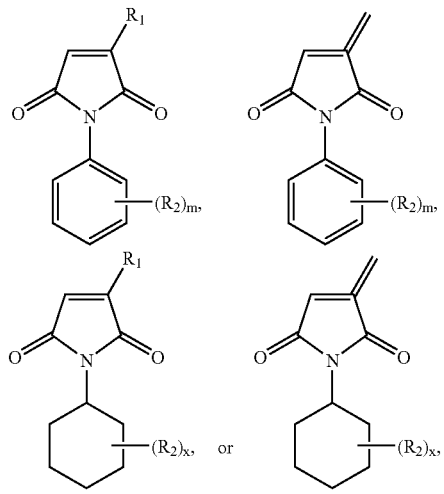

wherein:

$R_1$ is H or methyl, each $R_2$ is independently alkyl, alkoxy, aryloxy, halide, or —O(CO)—$R_3$, wherein $R_3$ is $C_1$-$C_{10}$ alkyl, m is 0 to 5, and x is 0 to 11.

In some embodiments of the invention, $R_2$ is methyl, ethyl, propyl, isopropyl, butyl, isobutyl, tert-butyl, phenyl, cyclohexyl, and the like. In other embodiments, $R_2$ is methoxy, ethoxy, propyloxy, phenoxy, and the like. In still other embodiments $R_2$ is a halide such as fluoride, chloride, or bromide. In other embodiments, $R_2$ is —O(CO)—$R_3$, wherein $R_3$ is $C_1$-$C_5$ alkyl.

In the practice of the invention, at least one mono-functional compound is combined with at least one thermosetting resin to produce a fully formulated adhesive composition. In some embodiments, two or more mono-functional monomers are combined to form a eutectic, which can then be readily combined with a thermosetting resin. Thermosetting resins contemplated for use in the practice of the invention include, for example, acrylates, methacrylates, maleimides, vinyl ethers, vinyl esters, styrenic compounds, allyl functional compounds, epoxies, oxetanes, oxazolines, benzoxazines, and the like.

The mono-functional compounds of the invention are typically present in invention adhesive compositions in an amount from 2 to 98 weight percent (wt %) based on the organic components present (excluding any fillers). In some embodiments, one monofunctional compound is combined with at least one thermosetting resin. In other embodiments, a combination of monofunctional compounds is added to more precisely control $T_g$, CTE, and modulus values.

In some embodiments, at least one curing initiator is typically present in the composition from 0.1 wt % to about 5 wt % based on total weight of the composition. In some embodiments, the initiator is a free-radical initiator. As used herein, the term "free radical initiator" refers to any chemical species which, upon exposure to sufficient energy (e.g., light, heat, or the like), decomposes into two parts which are uncharged, but which each possess at least one unpaired electron. Preferred free radical initiators contemplated for use in the practice of the present invention are compounds which decompose (i.e., have a half life in the range of about 10 hours) at temperatures in the range of about 70° C. up to 180° C. Exemplary free radical initiators contemplated for use in the practice of the present invention include peroxides (e.g., dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, tert-butyl hydroperoxide), and the like.

The term "free radical initiator" also includes photoinitiators. For example, for invention adhesive compositions that contain a photoinitiator, the curing process can be initiated by UV radiation. In one embodiment, the photoinitiator is present at a concentration of 0.1 wt % to 5 wt % based on the total weight of the organic compounds in the composition (excluding any filler). In a one embodiment, the photoinitiator comprises 0.1 wt % to 3.0 wt %, based on the total weight of the organic compounds in the composition. Photoinitiators include benzoin derivatives, benzilketals, α,α-dialkoxyacetophenones, α-hydroxyalkylphenones, α-aminoalkylphenones, acylphosphine oxides, titanocene compounds, combinations of benzophenones and amines or Michler's ketone, and the like.

In another embodiment of the invention, there are provided die-attach pastes including 0.5 weight percent to about 98 weight percent (wt %) of at least one mono-functional compound described herein, based on total weight of the composition, and 10 wt % to about 90 wt % of at least one thermosetting resin selected from acrylates, methacrylates, maleimides, vinyl ethers, vinyl esters, styrenic compounds, allyl functional compounds, epoxies, oxetanes, oxazolines, benzoxazines, and the like, based on total weight of the composition; 0 to about 90 wt % of a conductive filler; 0.1 wt % to about 5 wt % of at least one curing initiator, based on total weight of the composition; and 0.1 wt % to about 4 wt %, of at least one coupling agent, based on total weight of the composition.

Fillers contemplated for use in the practice of the present invention can be electrically conductive and/or thermally conductive, and/or fillers which act primarily to modify the rheology of the resulting composition. Examples of suitable electrically conductive fillers which can be employed in the practice of the present invention include silver, nickel, copper, aluminum, palladium, gold, graphite, metal-coated graphite (e.g., nickel-coated graphite, copper-coated graphite, and the like), and the like. Examples of suitable thermally conductive fillers which can be employed in the practice of the present invention include graphite, aluminum nitride, silicon carbide, boron nitride, diamond dust, alumina, and the like. Compounds, which act primarily to modify rheology, include silica, fumed silica, alumina, titania, calcium carbonate, and the like.

As used herein, the term "coupling agent" refers to chemical species that are capable of bonding to a mineral surface and which also contain polymerizable reactive functional group(s) so as to enable interaction with the adhesive composition. Coupling agents thus facilitate linkage of the die-attach paste to the substrate to which it is applied.

Exemplary coupling agents contemplated for use in the practice of the present invention include silicate esters, metal acrylate salts (e.g., aluminum methacrylate), titanates (e.g., titanium methacryloxyethylacetoacetate triisopropoxide), or compounds that contain a copolymerizable group and a chelating ligand (e.g., phosphine, mercaptan, acetoacetate, and the like). In some embodiments, the coupling agents contain both a co-polymerizable function (e.g., vinyl moiety, acrylate moiety, methacrylate moiety, and the like), as well as a silicate ester function. The silicate ester portion of the coupling agent is capable of condensing with metal hydroxides present on the mineral surface of substrate, while the co-polymerizable function is capable of co-polymerizing with the other reactive components of invention die-attach paste. In certain embodiments coupling agents contemplated for use in the practice of the invention are oligomeric silicate coupling agents such as poly(methoxyvinylsiloxane).

In some embodiments, both photoinitiation and thermal initiation may be desirable. For example, curing of a photoinitiator-containing adhesive can be started by UV irradiation, and in a later processing step, curing can be completed by the application of heat to accomplish a free-radical cure. Both UV and thermal initiators may therefore be added to the adhesive composition.

In general, these compositions will cure within a temperature range of 80-220° C., and curing will be effected within a length of time of less than 1 minute to 60 minutes. As will be understood by those skilled in the art, the time and temperature curing profile for each adhesive composition will vary, and different compositions can be designed to provide the curing profile that will be suited to the particular industrial manufacturing process.

In certain embodiments, the adhesive compositions may contain compounds that lend additional flexibility and toughness to the resultant cured adhesive. Such compounds may be any thermoset or thermoplastic material having a $T_g$ of 50° C. or less, and typically will be a polymeric material characterized by free rotation about the chemical bonds, the presence of ether groups, and the absence of ring structures. Suitable such modifiers include polyacrylates, poly(butadiene), poly-THF (polymerized tetrahydrofuran, also known as poly(1,4-butanediol)), CTBN (carboxy-terminated butadiene-acrylonitrile) rubber, and polypropylene glycol. When present, toughening compounds may be in an amount up to about 15 percent by weight of the maleimide and other monofunctional vinyl compound.

Inhibitors for free-radial cure may also be added to the adhesive compositions and die-attach pastes described herein to extend the useful shelf life of adhesive compositions containing the mono-functional compounds. Examples of these inhibitors include hindered phenols such as 2,6-di-tert-butyl-4-methylphenol; 2,6-di-tert-butyl-4-methoxyphenol; tert-butyl hydroquinone; tetrakis(methylene(3,5-di-tert-butyl-4-hydroxyhydrocinnamate))benzene; 2,2'-methylenebis(6-tert-butyl-p-cresol); and 1,3,5-trimethyl-2,4,6-tris(3',5'-di-tert-butyl-4-hydroxybenzyl)benzene. Other useful hydrogen-donating antioxidants include derivatives of p-phenylenediamine and diphenylamine. It is also well know in the art that hydrogen-donating antioxidants may be synergistically combined with quinones, and metal deactivators to make a very efficient inhibitor package. Examples of suitable quinones include benzoquinone, 2-tert butyl-1,4-benzoquinone; 2-phenyl-1,4-benzoquinone; naphthoquinone, and 2,5-dichloro-1,4-benzoquinone. Examples of metal deactivators include N,N'-bis(3,5-di-tert-butyl-4-hydroxyhydrocinnamoyl)hydrazine; oxalyl bis(benzylidenehydrazide); and N-phenyl-N'-(4-toluenesulfonyl)-p-phenylenediamine. Nitroxyl radical compounds such as TEMPO (2,2,6,6-tetramethyl-1-piperidnyloxy, free radical) are also effective as inhibitors at low concentrations. The total amount of antioxidant plus synergists typically falls in the range of 100 to 2000 ppm relative to the weight of total base resin. Other additives, such as adhesion promoters, in types and amounts known in the art, may also be added.

These compositions will perform within the commercially acceptable range for die attach adhesives. Commerically acceptable values for die shear for the adhesives on a 80×80 mil$^2$ silicon die are in the range of greater than or equal to 1 kg at room temperature, and greater than or equal to 0.5 kg at 240° C. Acceptable values for warpage for a 500×500 mil$^2$ die are in the range of less than or equal to 70 Nm at room temperature.

In yet another embodiment of the invention, there are provided assemblies of components adhered together employing the above-described adhesive compositions and/or die attach pastes. Thus, for example, assemblies comprising a first article permanently adhered to a second article by a cured aliquot of the above-described adhesive composition are provided. Articles contemplated for assembly employing invention compositions include memory devices, ASIC devices, microprocessors, flash memory devices, and the like.

Also contemplated are assemblies comprising a microelectronic device permanently adhered to a substrate by a cured aliquot of the above-described die attach paste. Microelectronic devices contemplated for use with invention die attach pastes include copper lead frames, Alloy 42 lead frames, silicon dice, gallium arsenide dice, germanium dice, and the like.

In still another embodiment of the present invention, there are provided methods for attaching two component parts to produce the above-described assemblies. Thus, for example, a first article can be attached to a second article, employing a method including:
(a) applying the above-described adhesive composition to the first article,
(b) bringing the first and second article into intimate contact to form an assembly wherein the first article and the second article are separated only by the adhesive composition applied in (a), and thereafter,
(c) subjecting the assembly to conditions suitable to cure the adhesive composition.

Similarly, a microelectronic device can be attached to a substrate, employing a method comprising:
(a) applying the above-described die attach paste to the substrate and/or the microelectronic device,
(b) bringing the substrate and the device into intimate contact to form an assembly wherein the substrate and the device are separated only by the die attach composition applied in (a), and thereafter,
(c) subjecting the assembly to conditions suitable to cure the die attach composition.

The following examples are intended only to illustrate the present invention and should in no way be construed as limiting the subject invention.

EXAMPLES

Example 1

3-Methoxyphenylmaleimide

Toluene (100 mL), triethylamine (10 g), methanesulfonic acid (15 g) were placed into a 500 ml, single-neck flask. Maleic anhydride (21.0 g, 214 millimoles) was dissolved into this mixture. This mixture was stirred magnetically at room temperature and m-anisidine (24.67 g, 200 millimoles) was then added drop-wise over a twenty minute period. A Dean-Stark trap and condenser were attached and the mixture was refluxed for three hours. A total of 3.7 ml of water was collected in the trap. The mixture was cooled to room temperature and the upper (toluene) phase was decanted off. The lower phase was extracted with 6×70 ml portions of fresh toluene. The collected toluene phase was passed over 27 grams of silica gel. The toluene was removed on a rotary evaporator to yield 27.3 g (67% of theory) of a clear yellow liquid. The product crystallized to a solid upon standing at room temperature. The solid melted at 75-76.5° C.

Example 2

2,4,6-Tribromophenylmaleimide

Into a 500 ml, single neck flask was placed 49.47 g (150 mmol) 2,4,6-tribromoaniline; 16.67 g (170 mmol) maleic anhydride; toluene (200 mL); and methanesulfonic acid (3.0 g). The 2,4,6-tribromaniline was only slightly soluble in this mixture upon stirring at room temperature. The mix was heated to reflux with a Dean-Stark trap and condenser attached. The mixture became a light red solution at reflux. The mixture was refluxed for 2.5 hours and 2.8 ml of water was collected in the trap. The residual acid was neutralized using ten grams sodium bicarbonate and two grams water. The mix was dried with six grams anhydrous magnesium sulfate and then passed over fifteen grams silica gel. The final product was recovered as a light yellow solid after removal of the toluene. It weighed 60.9 grams (99.0% of theory) and melted at 140-143.2° C.

Example 3

2,6-Diethylphenylmaleimide

Twenty-one grams (214 mmol) maleic anhydride, 2.14 grams methanesulfonic acid and toluene (96 mL) was placed in a single-neck, 500 ml flask. The mix was stirred magnetically and 29.8 grams (200 mmol) 2,6-diethylaniline was dripped in over ten minutes. The amic acid that formed stayed in solution. The mix was refluxed with a Dean-Stark trap and condenser attached for 2.5 hours. The water collected was equivalent to theory (3.6 ml). The toluene phase was passed over 33 grams silica gel. The toluene was removed to yield 45.6 g (99.6% of theory) of a light pink solid. It melted at 72-74° C.

Examples 4-12

Additional mono-maleimides were prepared using a method similar to that outlined in the above examples. A summary of all the mono-maleimide examples is presented in table 1.

TABLE 1

Synthesis Results for and Properties of Mono-maleimide Compounds

| Example | Compound | Yield (%) | Melting Point (° C.) | Residue (%) at 300° C. | $T_{dec.}$ (° C.) | $T_g$ (° C.) |
|---|---|---|---|---|---|---|
| 1 | 3-methoxyphenylmaleimide | 67.2 | 75–76.5 | 99.4 | 408 | 234 |
| 2 | 2,4,6-tribromophenylmaleimide | 99 | 140–143.2 | 94.6 | 456 | 216 |
| 3 | 2,6-diethylphenylmaleimide | 99.6 | 72–74 | 95.4 | 438 | 260 |
| 4 | 3-methylphenylmaleimide | 91 | 38–41.7 | 95.9 | 441 | 224 |
| 5 | 2,4-dimethylphenylmaleimide | 96 | 72.6–76.9 | 97.8 | 451 | 274 |
| 6 | cyclohexylmaleimide | 64 | 88.4–90.8 | 89.5 | 470 | 260 |
| 7 | 2-methylphenylmaleimide | 94.5 | 68.8–73.2 | 94.2 | 443 | 277 |
| 8 | 2,6-diisopropylphenylmaleimide | 99 | 112.4–116.4 | 87.5 | 435 | 127 |
| 9 | 2-phenoxyphenylmaleimide | 91.3 | 90.5–92.7 | 91.9 | 450 | 189 |
| 10 | 2-ethyl-6-methylphenylmaleimide | 99 | 87–90.7 | 95.1 | 450 | 288 |
| 11 | 2,6-dimethylphenylmaleimide | 94 | 107.7–111.6 | 93.0 | 448 | 289 |

Note:
The TGA residual weight and decomposition onsets were determined for all samples with 2% (by weight) added dicumyl peroxide. The ramp rate for the TGA was 10° C. per minute, and the furnace purge gas was air.

Example 12

Dimethylphenylitaconimide

Itaconic anhydride (11.21 g, 100 mmol) and 150 ml toluene were placed into a 500 ml, single neck flask. This mixture was stirred at room temperature and 12.12 g (100 mmol) of mixed xylidines was added over fifteen minutes. The mixture became a pink slurry of the amic acid in toluene. Methanesulfonic acid (1.0 g) was added and a Dean-Stark trap and condenser were attached. The mixture was refluxed for twenty-four hours and 1.7 ml (theory=1.8) of water was collected in the trap. The solution was cooled and neutralized with ten grams sodium bicarbonate and two grams water. The solution was dried with eight grams of anhydrous magnesium sulfate and then passed over twelve grams of silica gel. The toluene was removed to give 19.7 grams (91.5% of theory) of a viscous, light brown liquid. A portion of this monomer was catalyzed with two percent dicumyl peroxide and was found to have 92.6% residual weight at 300° C. and a decomposition onset of 348° C.

Example 13

Xylidinemaleimide

A 500 ml flask was charged with 43.15 g (440 mmole) maleic anhydride, 200 ml toluene and 2.5 g methanesulfonic acid. This mixture was stirred at room temperature until the maleic anhydride was completely dissolved. Mixed xylidines (48.48 g, 400 mmole) were then dripped in over the course of twenty minutes. The mix became a slurry, but it could still be stirred magnetically. A Dean-Stark trap and condenser were attached and the mix was brought to reflux. Reflux was continued for 14 hours and 6.8 ml (7.2=theoretical) water was collected. The mixture was cooled to room temperature and then neutralized with ten grams sodium bicarbonate plus four grams water. It was dried with 12 grams anhydrous magnesium sulfate and then passed over 20 g silica gel. The toluene was removed to give 72.85 g (90.5%) of a moderately viscous, red liquid. A portion of this liquid was catalyzed with 2% dicumyl peroxide. The residual weight at 91.2% and the decomposition onset was 440° C.

Example 14

Tricyclodecanemethanol Acrylate

To a 500 mL flask equipped with a Dean-Stark trap was added tricyclodecyl methanol (50 g, 300 mmol), acrylic acid (23.8 g, 330 mmol), heptane (250 mL), methanesulfonic acid (3.0 g), and MEHQ (132 mg). The mixture was refluxed for 65 minutes under a mild air sparge, at which point 5.3 mL water (theoretical amount 5.4 mL) had collected in the Dean-Stark trap. The mixture was washed with sodium bicarbonate, dried over magnesium sulfate, and finally passed over silica gel. The solvent was removed by rotary evaporation to afford the product (64.3 g, 97.3% yield).

Example 15

Tricyclodecanemethanol Methacrylate

This compound was synthesized as described in Example 1, with methacrylic acid substituted for acrylic acid. The product was obtained in 97.7% yield.

Example 16

Isobornylcyclohexyl Acrylate

To a 500 mL flask equipped with a Dean-Stark trap was added isobornylcyclohexanol (9.8 g, 41 mmol), acrylic acid (3.6 g, 50 mmol), heptane (200 mL), methanesulfonic acid (0.3 g), and MEHQ (28 mg). The mixture was refluxed for 4.5 hours under a mild air sparge, at which point 5.3 mL water (theoretical amount 5.4 mL) had collected in the Dean-Stark trap. The mixture was washed with sodium bicarbonate, dried over magnesium sulfate, and finally passed over silica gel. The solvent was removed by rotary evaporation to afford the product (10.7 g, 90% yield).

Example 17

Thermal Data

Two adhesive compositions were prepared. Composition A and Composition B both contained proprietary thermosetting resins with a free-radical curing initiator. 2-methylphenylmaleimide and 2,4-dimethylphenylmaleimide were combined in a 1:1 mol/mol ratio to form a eutectic mixture and then this mixture was incorporated into Composition B at 16.7 wt %.

|  | Composition A | Composition B |
|---|---|---|
| Tg | 82° C. | 129° C. |
| $\alpha_1$ (ppm/° C.) | 45 | 55 |
| $\alpha_2$ | 117 | 127 |
| Modulus (GPa) (room temp) | 3.7 Gpa | 3.9 GPa |

Example 18

Thermal Data

Two adhesive compositions were prepared. Composition C and Composition D both contained proprietary thermosetting resins with a free-radical curing initiator. 2-methylphenylmaleimide and 2,4-dimethylphenylmaleimide were combined in a 1:1 mol/mol ratio to form a eutectic mixture and then this mixture was incorporated into Composition C at 10 wt % and Composition D at 50 wt %.

|  | Composition C | Composition D |
|---|---|---|
| $Tg_1$ (° C.) | −1.4 | 50.8 |
| $Tg_2$ | 62 | 184 |
| $\alpha_1$ (ppm/° C.) | 84.6 | 72.5 |
| $\alpha_2$ | 160 | 140 |

This example demonstrates the dramatically increased $T_g$ values that can be obtained by increasing the amount of monofunctional monomers in the adhesive composition. In addition, the data show that CTE values can be decreased by the use of the monofunctional monomers described herein.

Example 19

Thermal Data

Table 2 set forth below presents a series of data indicating melting points of mixtures of some exemplary monofunctional monomers according to the invention. The data was obtained by differential scanning calorimetry (DSC).

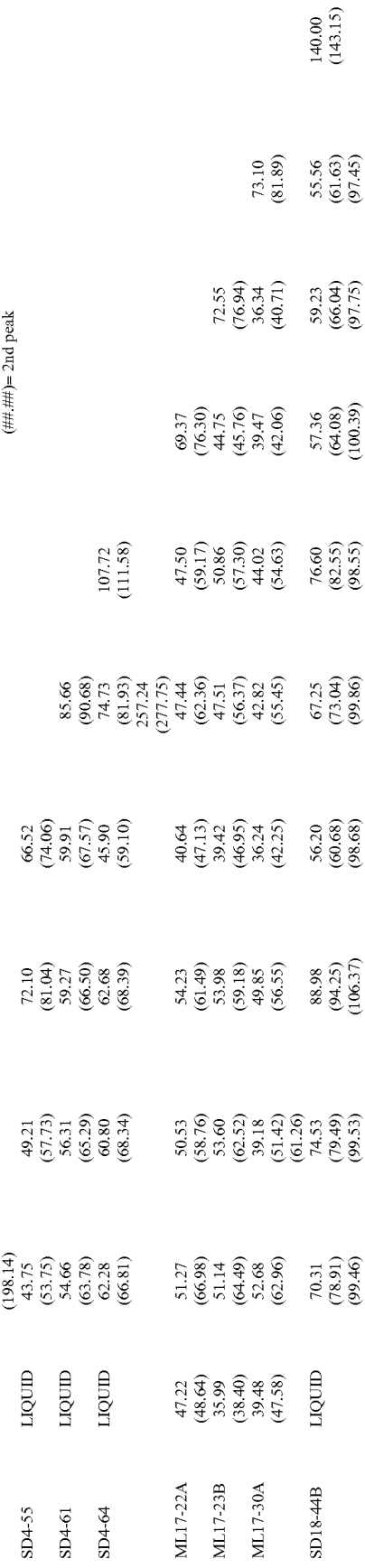

| | SD4-42A | SD4-42C | SD4-46A | SD4-47B | SD4-55 | SD4-61 | SD4-64 | ML17-22A | ML17-23B | ML17-30A | SD18-44B |
|---|---|---|---|---|---|---|---|---|---|---|---|
| SD4-42A | 38.12<br>(41.67)<br>59.02<br>(66.56)<br>43.45<br>(60.63)<br>45.50<br>(55.91) | | | | | | | LEGEND<br>(##.##)= peak<br>##.##= 2nd onset<br>(##.##)= 2nd peak | | | |
| SD4-42C | | 88.36<br>(90.82)<br>63.76<br>(73.03)<br>59.15<br>(64.82)<br>163.23<br>(198.14) | | | | | | | | | |
| SD4-46A | | | 90.50<br>(92.66)<br>68.87<br>(76.78) | | | | | | | | |
| SD4-47B | | | | 112.43<br>(116.44) | | | | ##.##=onset | | | |
| SD4-55 | LIQUID | 43.75<br>(53.75)<br>54.66<br>(63.78)<br>62.28<br>(66.81) | 49.21<br>(57.73)<br>56.31<br>(65.29)<br>60.80<br>(68.34) | 72.10<br>(81.04)<br>59.27<br>(66.50)<br>62.68<br>(68.39) | 66.52<br>(74.06)<br>59.91<br>(67.57)<br>45.90<br>(59.10) | | | | | | |
| SD4-61 | LIQUID | | | | | 85.66<br>(90.68)<br>74.73<br>(81.93)<br>257.24<br>(277.75) | | | | | |
| SD4-64 | LIQUID | | | | | | 107.72<br>(111.58) | | | | |
| ML17-22A | 47.22<br>(48.64)<br>35.99<br>(38.40)<br>39.48<br>(47.58) | 51.27<br>(66.98)<br>51.14<br>(64.49)<br>52.68<br>(62.96) | 50.53<br>(58.76)<br>53.60<br>(62.52)<br>39.18<br>(51.42)<br>61.26<br>(61.26) | 54.23<br>(61.49)<br>53.98<br>(59.18)<br>49.85<br>(56.55) | 40.64<br>(47.13)<br>39.42<br>(46.95)<br>36.24<br>(42.25) | 47.44<br>(62.36)<br>47.51<br>(56.37)<br>42.82<br>(55.45) | 47.50<br>(59.17)<br>50.86<br>(57.30)<br>44.02<br>(54.63) | 69.37<br>(76.30)<br>44.75<br>(45.76)<br>39.47<br>(42.06) | | | |
| ML17-23B | | | | | | | | | 72.55<br>(76.94)<br>36.34<br>(40.71) | | |
| ML17-30A | | | | | | | | | | 73.10<br>(81.89) | |
| SD18-44B | LIQUID | 70.31<br>(78.91)<br>(99.46) | 74.53<br>(79.49)<br>(99.53) | 88.98<br>(94.25)<br>(106.37) | 56.20<br>(60.68)<br>(98.68) | 67.25<br>(73.04)<br>(99.86) | 76.60<br>(82.55)<br>(98.55) | 57.36<br>(64.08)<br>(100.39) | 59.23<br>(66.04)<br>(97.75) | 55.56<br>(61.63)<br>(97.45) | 140.00<br>(143.15) |

What is claimed is:

1. An adhesive composition comprising a thermosetting resin and at least one monomer selected from the group consisting of:

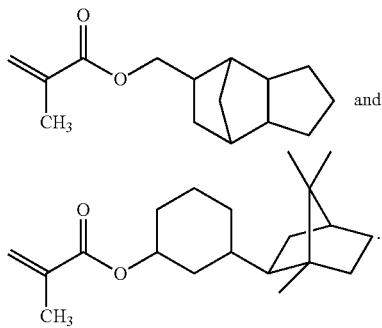

and

2. The adhesive composition of claim 1, wherein the composition has a $T_g$ of at least 50° C.

3. The adhesive composition of claim 1, wherein the composition has a $T_g$ of at least 100° C.

4. The adhesive composition of claim 1, wherein the composition has a $T_g$ of at least 150° C.

5. The adhesive composition of claim 1, wherein the composition has a $T_g$ of at least 200° C.

6. The adhesive composition of claim 1, wherein the thermosetting resin comprises a moiety selected from the group consisting of acrylate, methacrylate, maleimide, vinyl ether, vinyl ester, styrene, allyl, epoxy, oxetane, oxazoline, and benzoxazine moieties.

7. The adhesive composition of claim 1, further comprising a filler.

8. The adhesive composition of claim 7, wherein the filler is conductive.

9. The adhesive composition of claim 8, wherein the filler is thermally conductive.

10. The adhesive composition of claim 8, wherein the filler is electrically conductive.

11. A method for attaching a semiconductor die to a substrate comprising:
    (a) applying the adhesive composition of claim 1 to the substrate the semiconductor die, or both;
    (b) bringing the substrate and the semiconductor die into contact to form an assembly, wherein the substrate and the die are separated only by the adhesive applied in (a); and
    (c) curing the adhesive, thereby adhesively attaching the semiconductor die to the substrate.

* * * * *